(12) United States Patent
Shostak et al.

(10) Patent No.: US 12,149,942 B2
(45) Date of Patent: *Nov. 19, 2024

(54) SYSTEMS AND METHODS FOR NETWORK ACCESS SECURITY

(71) Applicant: Verizon Patent and Licensing Inc., Basking Ridge, NJ (US)

(72) Inventors: Mark Shostak, Plano, TX (US); Nandan Naik, Salem, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/818,754

(22) Filed: Aug. 10, 2022

(65) Prior Publication Data

US 2022/0386128 A1    Dec. 1, 2022

Related U.S. Application Data

(63) Continuation of application No. 17/146,712, filed on Jan. 12, 2021, now Pat. No. 11,445,375.

(51) Int. Cl.
| | |
|---|---|
| *G06F 21/00* | (2013.01) |
| *H04W 8/18* | (2009.01) |
| *H04W 12/00* | (2021.01) |
| *H04W 12/37* | (2021.01) |
| *H04W 12/71* | (2021.01) |
| *H04W 12/72* | (2021.01) |
| *H04W 60/00* | (2009.01) |

(52) U.S. Cl.
CPC ........... *H04W 12/37* (2021.01); *H04W 8/183* (2013.01); *H04W 12/009* (2019.01); *H04W 12/71* (2021.01); *H04W 12/72* (2021.01); *H04W 60/00* (2013.01)

(58) Field of Classification Search
None
See application file for complete search history.

(56) References Cited

U.S. PATENT DOCUMENTS

| | | | |
|---|---|---|---|
| 7,995,994 | B2 | 8/2011 | Khetawat et al. |
| 8,280,373 | B2 * | 10/2012 | Huggett ................ H04L 63/101 455/434 |
| 8,660,533 | B2 | 2/2014 | Khan et al. |
| 8,977,263 | B2 | 3/2015 | Chin et al. |
| 9,143,942 | B2 | 9/2015 | Agarwal et al. |
| 10,251,053 | B1 | 4/2019 | Paczkowski et al. |
| 11,064,345 | B1 * | 7/2021 | Mahajan ................ H04W 12/43 |
| 2007/0076760 | A1 | 4/2007 | Wennberg et al. |

(Continued)

*Primary Examiner* — Maung T Lwin (57) ABSTRACT

A method may include receiving an attach request that includes an international mobile equipment identity (IMEI) and an international mobile subscriber identity (IMSI), and determining whether the IMEI is associated with a user device that is not allowed to attach to the network. The method may also include determining whether the IMSI included in the attach request is stored in a database, and determining whether an IMEI associated with the IMSI is stored in the database. The method may further include determining whether the IMEI stored in the database matches the IMEI included in the attach request and denying the attach request in response to determining that the IMEI stored in the database does not match the IMEI included in the attach request.

20 Claims, 7 Drawing Sheets

(56) References Cited

U.S. PATENT DOCUMENTS

| | | |
|---|---|---|
| 2007/0173251 A1 | 7/2007 | Vikberg et al. |
| 2015/0327073 A1 | 11/2015 | Rommer et al. |
| 2017/0150344 A1* | 5/2017 | Li .................... H04L 63/101 |
| 2018/0220291 A1* | 8/2018 | Fares ................ H04W 12/082 |
| 2018/0317087 A1 | 11/2018 | Drevon et al. |
| 2019/0289464 A1* | 9/2019 | Loreskar ............ H04L 63/101 |
| 2020/0084633 A1* | 3/2020 | Soliman ............ H04W 12/068 |
| 2021/0378036 A1* | 12/2021 | Singh ................ H04W 84/042 |

* cited by examiner

SYSTEMS AND METHODS FOR NETWORK ACCESS SECURITY

RELATED APPLICATION

This patent application is a Continuation of U.S. application Ser. No. 17/146,712 filed on Jan. 12, 2021, titled "Systems and Methods for Network Access Security," the disclosure of which is hereby incorporated by reference herein in its entirety

BACKGROUND INFORMATION

Wireless communication systems typically employ a physical security device located on a subscriber's wireless device to allow the wireless device to be granted access to a service provider's network. For example, a universal integrated circuit card (UICC) or a universal subscriber identity module (USIM) (referred to generically herein as a SIM), may be included in a wireless device to allow the wireless device to obtain access to a service provider's network. The SIM associates the user device and the services consumed by the user device with the subscriber.

The physical SIM is typically provided by the service provider/network operator and is pre-provisioned with information that allows a user of the wireless device (e.g., a smart phone) to access the service provider's network. The SIM can also be removed from one user device and installed in a new user device when the user upgrades/replaces his/her smart phone.

While the use of a physical SIM provides the user with flexibility when upgrading to a new device, the physical SIM may also cause security issues. For example, the SIM can be extracted from an authorized user device and installed in an unauthorized device. The unauthorized device may then be able to access network services, as well as potentially access a private network and resources associated with the private network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
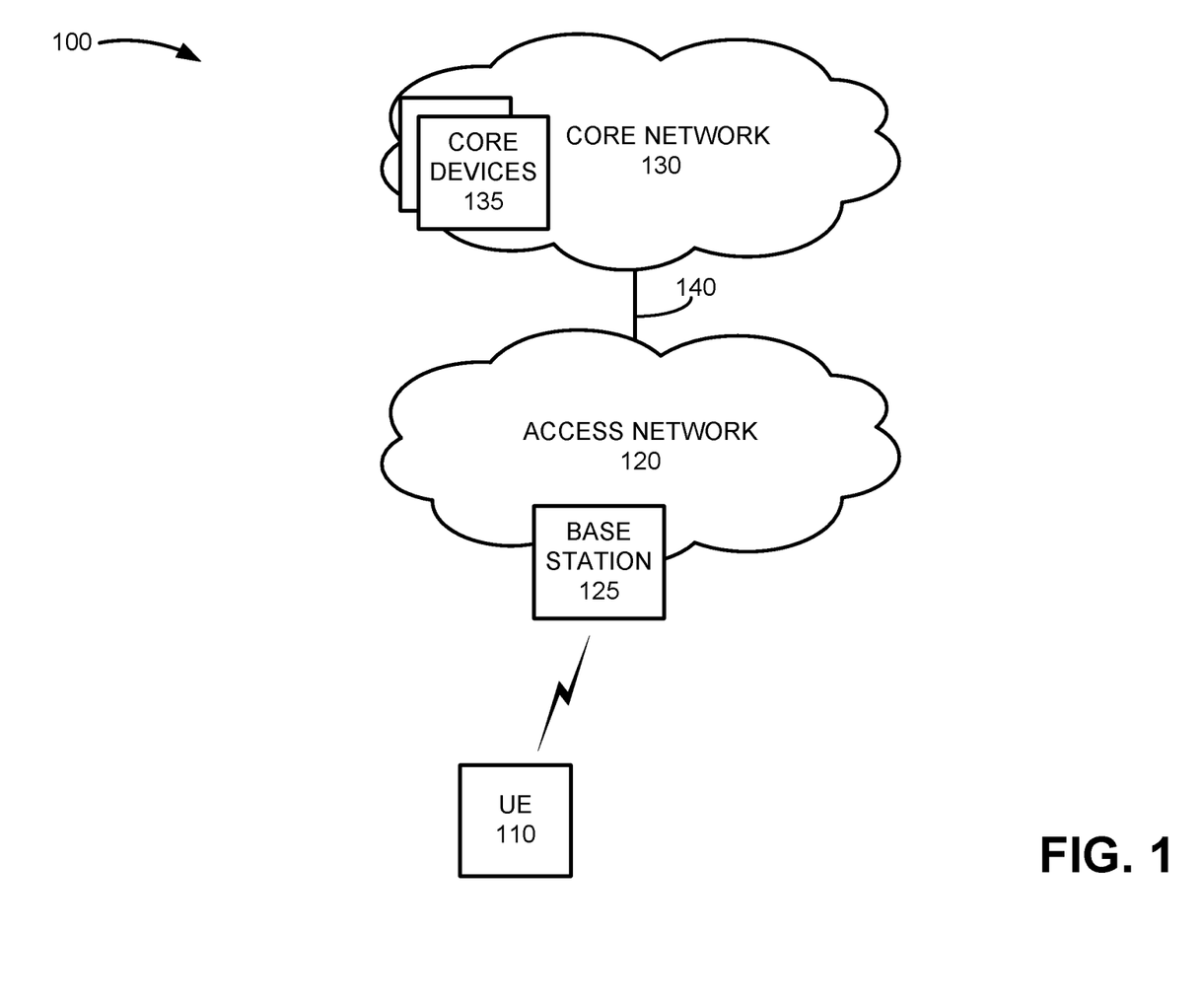
FIG. 1 illustrates an exemplary environment in which systems and methods described herein may be implemented.

Implementations described herein provide network security associated with user equipment (UE) devices attempting to attach to a network. In an exemplary implementation, the service provider network determines whether subscriber identity information and equipment identity information provided during an attach procedure by a UE device, which includes a physical subscriber identity module (SIM), corresponds to a subscriber and UE device authorized to access the service provider's network. In an exemplary implementation, a network SIM secure (NSS) device controlled by the service provider determines whether the UE device is permitted to attach to the network without relying upon any authorization or determination made by the SIM itself, or the UE device itself. As a result, a number of attack scenarios associated with UE devices employing compromised physical SIMs may be reduced. For example, since the NSS device and the communication channels used to control the NSS device functionality reside within the service provider's network, a number of attack vectors related to interception, injection, simulation, etc., of communication messages that may be used to attempt to enable compromised UE devices to attach to the network are significantly reduced or eliminated FIG. 1 is a diagram illustrating an exemplary environment 100 in which systems and methods described herein may be implemented. Referring to FIG. 1, environment 100 includes user equipment (UE) device 110 (individually referred to as UE 110 or UE device 110), access network 120, base station 125, core network 130 and core devices 135. Elements of environment 100 may include network devices, network elements and/or network functions (referred to herein as network devices) that may be implemented according to one or multiple network architectures (e.g., a client device, a server device, a peer device, a proxy device, a cloud device, a virtualized function, and/or another type of network architecture (e.g., Software Defined Network (SDN), virtual, logical, network slicing, etc.)). Additionally, a network device, element or function may be implemented according to various computing architectures, such as centralized, distributed, cloud (e.g., elastic, public, private, etc.), edge, fog, and/or another type of computing architecture.

Environment 100 includes communication links between devices, such as links between UE 110 and access network 120 and links between access network 120 and core network 130, such as link 140. The links in environment 100 may include wired, optical, and/or wireless communication links. In addition, connections between devices in environment 100 may be direct or indirect.

UE 110 may include a mobile device, such as wireless or cellular telephone device (e.g., a conventional cell phone with data processing capabilities), a smart phone, a personal digital assistant (PDA) that can include a radiotelephone, etc. In another implementation, UE 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE 110 may be implemented as a machine-type communications (MTC) device, an Internet of Things (IoT) device, a machine-to-machine (M2M) device, etc., that includes communication functionality, such as a home appliance device, a home monitoring device, a camera, etc. UE 110 may connect to access network 120 in a wireless manner. UE 110 and the person associated with UE 110 (e.g., the party holding or using UE 110) may be referred to collectively as UE 110 in the description below.

In an exemplary implementation, UE 110 uses wireless channels to communicate with base station 125. The wireless channels may correspond, for example, to a physical layer in accordance with different radio access technology (RAT) types. For example, wireless channels may correspond to physical layer associated with Fifth Generation (5G) New Radio (NR) standards. In other implementations, the wireless channels may correspond to physical layers associated with Fourth Generation Long Term Evolution (4G LTE), 4.5G or other air interfaces. In an exemplary implementation, UE 110 may be a 5G-capable device that provides voice communication, mobile broadband services (e.g., video streaming, real-time gaming, high speed Internet access etc.), best effort data traffic, and/or other types of applications via a 5G NR service using various frequency bands, including millimeter wave (mmWave) radio frequencies. In other implementations, UE 110 may be a 4G LTE capable device and/or a dual connectivity device capable of communicating in accordance with both 4G LTE and 5G standards.

Access network 120 may include a radio access network (RAN) that provides a connection between UE 110 and core network 130. For example, access network 120 may include base station 125. Access network 120 and base station 125 may support multiple networks of multiple types and technologies. In an exemplary implementation, access network 120 may include a 5G RAN, a 4.5G RAN, a 4G RAN, and/or another type of future generation RAN. According to various exemplary implementations, access network 120 may also be implemented to include various architectures associated with wireless services, such as, for example, macrocell, microcell, femtocell, picocell, metrocell, 5G NR cell, LTE cell, non-cell, or another type of cell architecture.

Base station 125 may service a number of UEs 110. In one implementation, base station 125 may include a 4G base station (e.g., an evolved NodeB (eNB)) that communicates wirelessly with UEs 110 located within the service range of base station 125. In another implementation, base station may include a 5G base station (e.g., a next generation NodeB (gNB)) that includes one or more radio frequency (RF) transceivers. In still other implementations, base station 125 may include a radio network controller (RNC), a remote radio head (RRH), a baseband unit (BBU), a small cell node (e.g., a picocell device, a femtocell device, a microcell device, a home eNB, a repeater, etc.), or another type of wireless node.

Core network 130 may include one or more wired, wireless and/or optical networks that are capable of receiving and transmitting data, voice and/or video signals. For example, core network 130 may include one or more public switched telephone networks (PSTNs), one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a 4G network, a 4G LTE Advanced network, a 5G network, an intranet, the Internet, or another type of network that is capable of transmitting data. Core network 130 may provide packet-switched services and wireless Internet protocol (IP) connectivity to various components in environment 100, such as UE 110 to provide, for example, data, voice, and/or multimedia services.

In an exemplary implementation, core network 130 may include various types of network devices or functions, such as core devices 135, used to facilitate communications in environment 100. For example, core devices 135 may include elements of a 4G LTE network and/or 5G network used to ensure a physical SIM included in UE 110 is properly associated with UE 110 and a subscriber to network services, as described in detail below.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UEs 110 and base stations 125, as well as multiple access networks 120 and/or core networks 130. Environment 100 may also include elements, such as switches, gateways, routers, monitoring devices, etc. (not shown), that aid in routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2A:
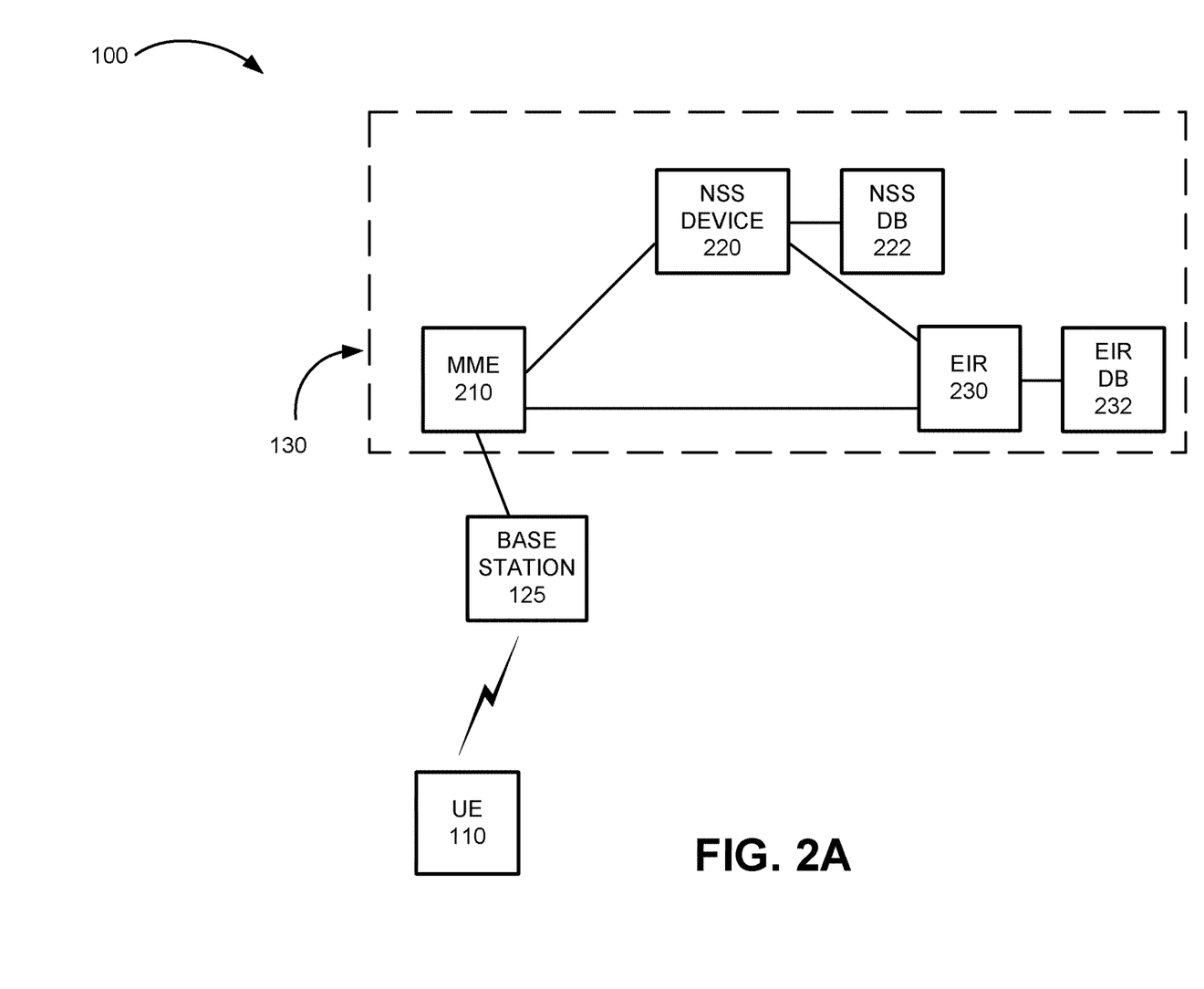
FIGS. 2A and 2B illustrate a portion of elements implemented in the environment of 100 in accordance with exemplary implementations.

FIG. 2A is a functional block diagram of a portion of environment 100 in accordance with an exemplary implementation. Referring to FIG. 2A, core network 130 includes various network elements or functions, such as mobile management entity (MME) 210, network SIM secure (NSS) device 220, NSS database 222, equipment identity register (EIR) 230 and EIR database 232. These elements may be implemented in one or more core devices 135. It should be understood that core network 130 may include additional and/or different devices. For example, core network 130 may include a serving gateway (SGW), a home subscriber server (HSS), a packet data network gateway, and a Policy and Charging Rules Function (PCRF), various call session control functions (CSCF), etc. (not shown), used to route information in a 4G LTE network. In other implementations, such as a 5G implementation, core network 130 may include an Access and Mobility Function (AMF), a User Plane Function (UPF), a Session Management Function (SMF), an Application Function (AF), a Unified Data Management (UDM), a Policy Control Function (PCF), a Network Repository Function (NRF), an Authentication Server Function (AUSF), a Network Slice Selection Function (NSSF), etc. In such an implementation, the functionality described below with respect to MME 210 may be performed by an AMF or other device/function in the 5G network.

MME 210 may implement control plane processing for access network 120. For example, through base station 125 (e.g., an eNodeB), MME 210 may implement tracking and paging procedures for UE 110 and may activate and deactivate bearers for UE 110 to provide normal coverage service for UE 110. MME 210 may also select a particular SGW (not shown) for a particular UE 110. MME 210 may interface with other MMEs (not shown) in core network 130 and may send and receive information associated with UEs 110, which may allow one MME 210 to take over control plane processing of UEs 110 serviced by another MME 210, if the MME 210 becomes unavailable.

NSS device 220 may include a computing device or server that includes logic to determine whether a UE 110 hosting a physical SIM is authorized to access core network 130, as described in detail below. In an exemplary implementation, NSS device 220 may make its determination of whether to allow UE 110 to access network 130 without depending on any determination made at UE 110. That is, the physical SIM on UE 110 or UE 110 itself is not involved in authorizing any SIM-UE relationship, as described in detail below. For example, NSS device 220 may include or interface with NSS database 222 to determine whether a UE 110 is authorized to attach to network 130, as described below.

EIR 230 may include a computing device that includes logic associated with performing a mobile identity check. For example, UE 110 may include an equipment identifier, such as an international mobile equipment identity (IMEI) number, that uniquely identifies UE 110. EIR 230 may receive the IMEI via, for example, MME 210, and determine if the IMEI is included in a blacklist associated with UEs 110 that may be prohibited from accessing core network 130, as described in detail below. For example, EIR 230 may include or interface with EIR database 232 to determine whether a UE 110 is blacklisted and is not allowed to attach to network 130, as described below. In some implementations, EIR 230 may not be needed, such as in situations in which UE 110 may be connecting to a private network (e.g., a company's private LTE or 5G network).

Figure 2B:
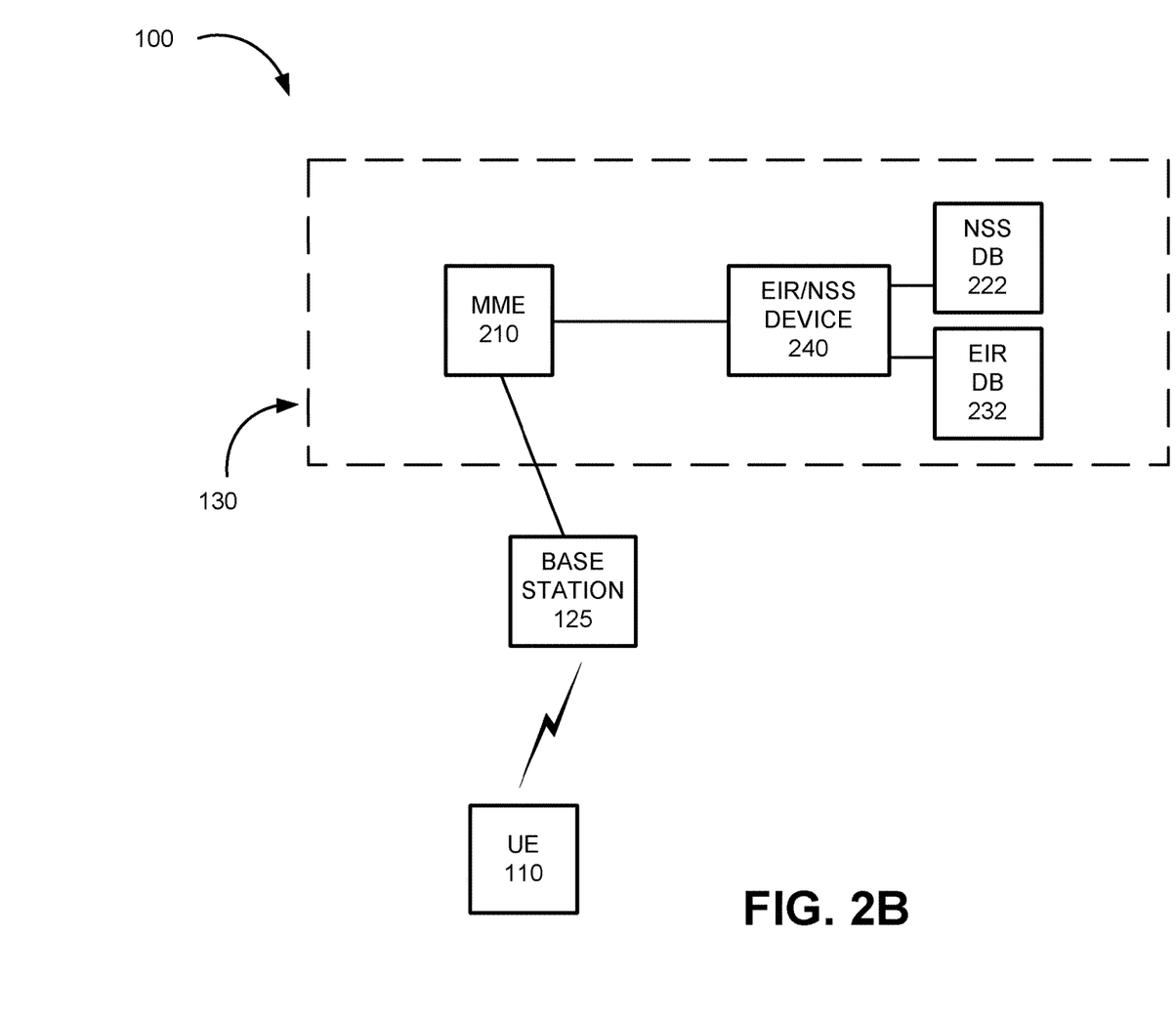

In the implementation illustrated in FIG. 2A, NSS device 220 and EIR 230 are implemented as separate devices. In other implementations, the functionality of NSS device 220 and EIR 230 may be combined in a single element or function. For example, FIG. 2B illustrates a functional block diagram of a portion of environment 100 in another exemplary implementation in which the functionality of NSS device 220 and EIR 230 are combined. Referring to FIG. 2B, core network 130 may include MME 210, EIR/NSS device 240, NSS database 222 and EIR database 232. These elements may be implemented in one or more core devices 135. Similar to FIG. 2A, it should be understood that core network 130 may include additional and/or different devices. For example, core network 130 may include an SGW, an HSS, a PGW, a PCRF, various CSCFs, etc., used to route information in a 4G LTE network. Core network 130 may additionally or alternatively include elements of a 5G network, such as an AMF, UPF, SMF, AF, UDM, PCF, NRF, AUSF, NSSF, etc.

In the implementation illustrated in FIG. 2B, EIR/NSS device 240 may include or interface with NSS database 222 and EIR database 232 as described above with respect to FIG. 2A. In either implementation, elements in core network 130 may determine whether a UE 110 is permitted to attach to network 130 using a network-based approach without relying on any determinations made at UE 110.

Figure 3:
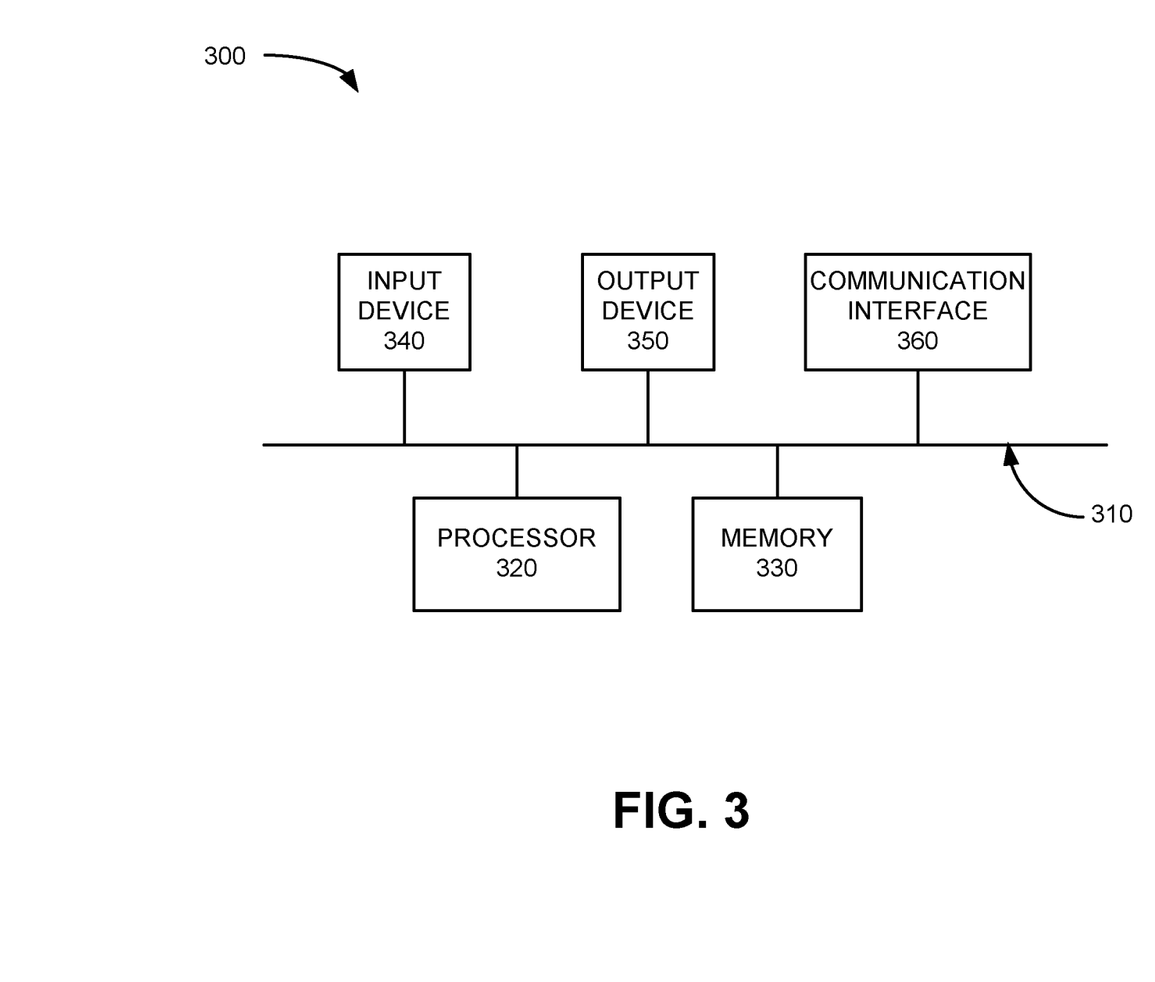
FIG. 3 illustrates an exemplary configuration of components that may be implemented in one or more of the devices/elements of FIGS. 1, 2A and/or 2B.

FIG. 3 illustrates an exemplary configuration of a device 300. Device 300 may correspond to or include elements implemented in UE 110, base station 125, MME 210, NSS device 220, EIR 230, EIR/NSS device 240 and other devices/elements in environment 100. Referring to FIG. 3, device 300 may include bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data via access network 120 and/or core network 130. Communication interface 360 may also include a modem or an Ethernet interface to a LAN or other mechanisms for communicating with elements in a network, such as access network 120 and/or core network 130 or another network.

The exemplary configuration illustrated in FIG. 3 is provided for simplicity. It should be understood that device 300 may include more or fewer devices than illustrated in FIG. 3. In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

As discussed above, systems and methods described herein provide network security to ensure that a UE 110 is authorized to access a network while hosting a physical SIM without requiring the SIM or UE 110 itself to perform any authorization related checking. For example, in one implementation, NSS device 220 leverages an IMEI check that may be used by service providers/network operators to preclude stolen, delinquent or otherwise non grata devices from being able to attach to the service provider's network.

For example, assume that UE 110 is attempting to attach to core network 130 via access network 120 (e.g., base station 125). In this case, base station 125 may forward an attach request from UE 110 to MME 210. MME 210 may send a communication to EIR 230, such as a mobile equipment (ME)-Identity-Check-Request (ECR) message via, for example, an S13 interface. The ECR message may include the IMEI of UE 110. EIR 220 may then check EIR database 232 that stores a list of blacklisted UE's 110 (e.g., UEs 110 that are not permitted to access core network 130) for the IMEI contained in the ECR message. If the IMEI is found in EIR database 232, UE 110 has been blacklisted. EIR 230 may send an ME-Identity-Check-Answer (ECA) message via, for example, an S13 interface to MME 210 indicating that the attach request is denied. If the IMEI is not found in EIR database 232, the ECA message indicates that UE 110 is granted access to services and/or resources.

In accordance with an exemplary implementation, NSS device 220 leverages MME 210 to determine whether an international mobile subscriber identity (IMSI) number and IMEI are properly associated with an authorized UE 110. For example, when a UE 110 attempts to attach to core network 130, MME 210 may receive an attach request. In an exemplary implementation, NSS device 220 may be coupled to MME 210 and optionally EIR 230. MME 210 may forward an ECR message to NSS device 220 and determine if the IMSI and IMEI received with an attach request are stored in NSS database 222, indicating that the physical SIM is being used by an authorized subscriber's UE 110, as described in detail below.

Figure 4:
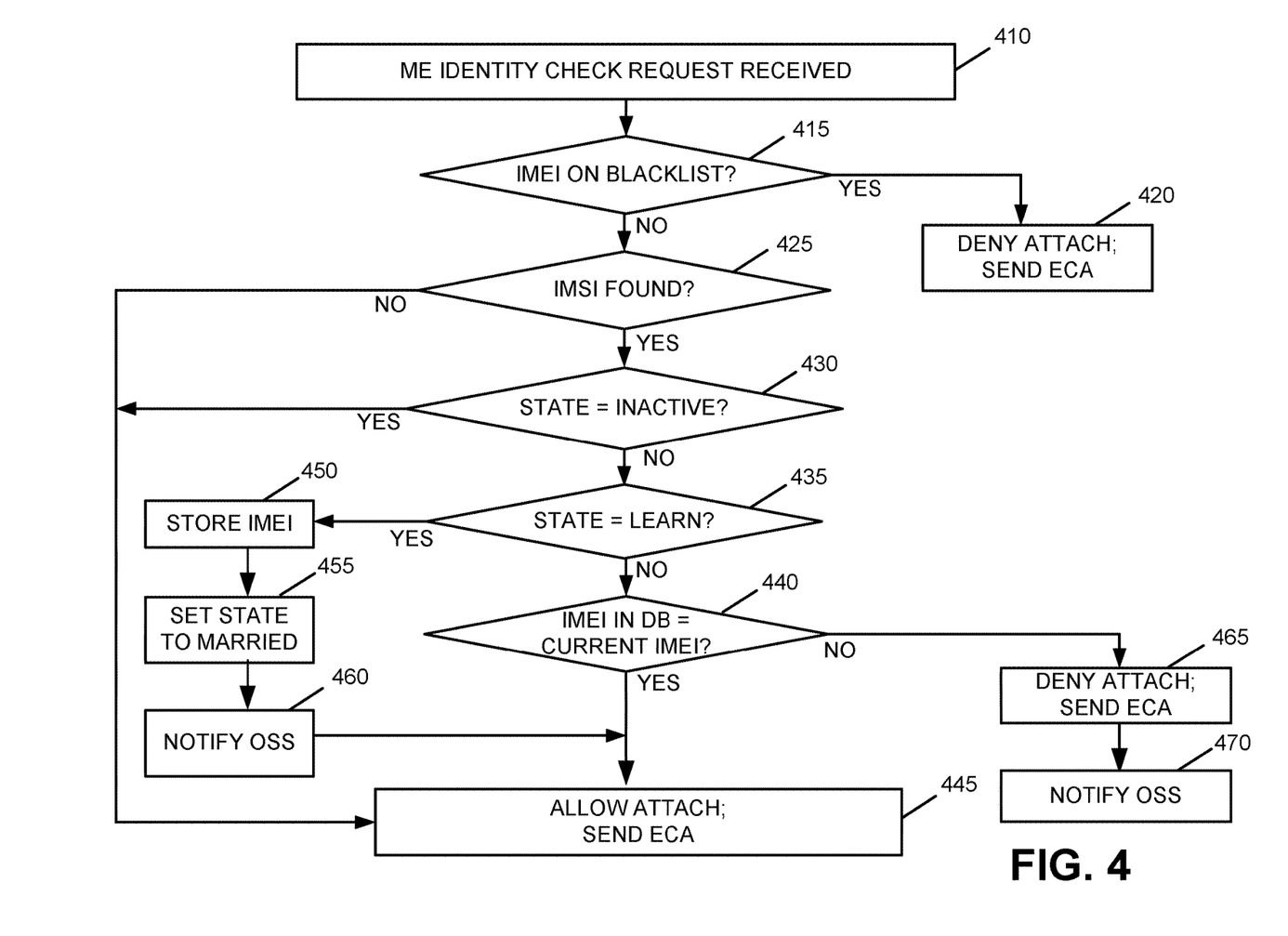
FIG. 4 is a flow diagram illustrating processing by various components in FIGS. 1-3 associated with an attach request in accordance with an exemplary implementation.
Figure 5A:
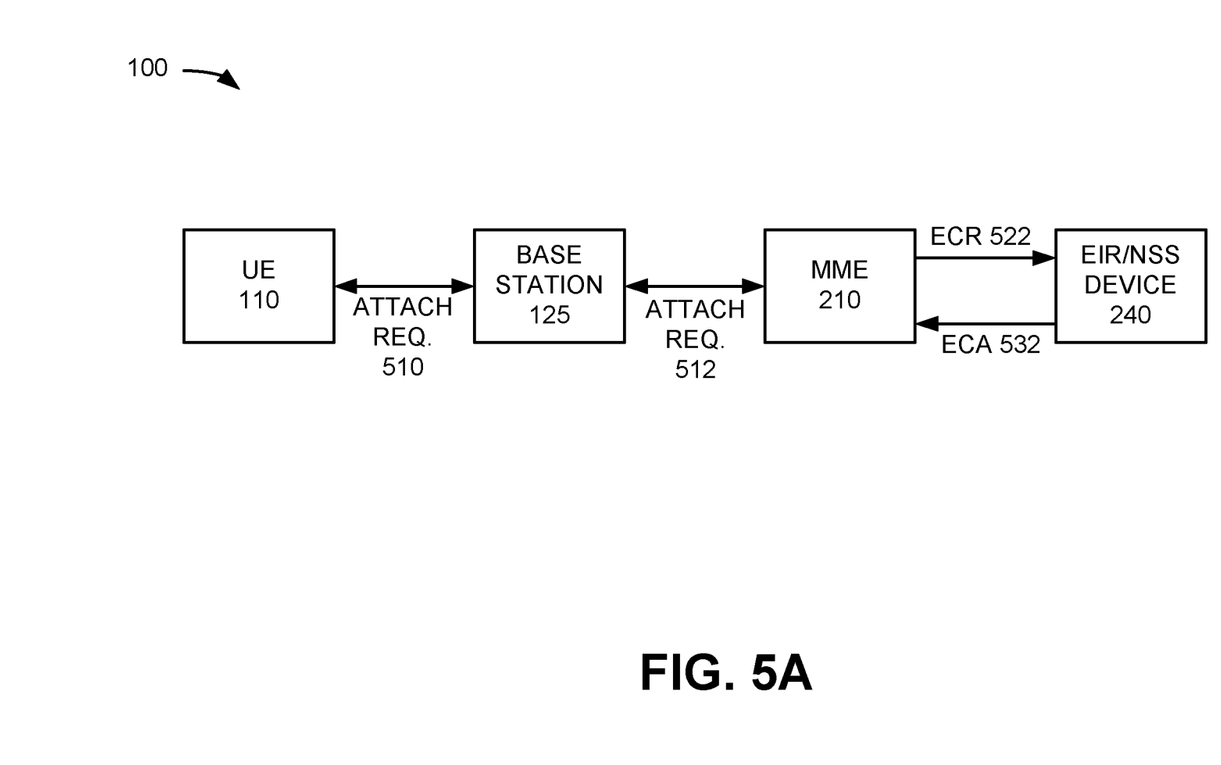
FIG. 5A is a signal diagram associated with the processing of FIG. 4 in accordance with an exemplary implementation.

FIG. 4 is a flow diagram illustrating exemplary processing associated with UE 110 attempting to attach to core network 130. The flow diagram of FIG. 4 is described in conjunction with the signal diagram of FIG. 5A, which corresponds to the implementation illustrated in FIG. 2B in which EIR/NSS device 240 includes combined functionality associated with an EIR and an NSS device. Processing may begin with UE 110 sending an attach request to base station 125 (FIG. 5A, attach request 510). The attach request may include an international mobile subscriber identity (IMSI) number of the subscriber associated with UE 110 and an IMEI associated with UE 110. Base station 125 receives the attach request and forwards the attach request to MME 210 (FIG. 5A, attach request 512). MME 210 receives the attach request and generates a Mobile Equipment-Identity-Check-Request (ECR) message that includes the IMEI and IMSI included in the attach request. MME 210 forwards the ECR to EIR/NSS device 240 (FIG. 5A, ECR 522). EIR/NSS device 220 receives the ECR message (FIG. 4, block 410).

EIR/NSS device 240 may determine whether the IMEI included in the attach request is included in a blacklist database identifying UEs 110 that are not permitted to attach to network 130 (block 415). For example, EIR/NSS device 240 may access EIR database 232 and determine if the IMEI has been blacklisted. If EIR/NSS device 240 determines that the IMEI has been blacklisted (block 415—yes), EIR/NSS device 240 may deny the attach request and signal MME 210 via an ME-Identity-Check-Answer (ECA) message that the attach request from UE 110 is to be denied (block 420; FIG. 5A, 532). The attach denial may then be communicated to base station 125 and UE 110.

If the IMEI has not been blacklisted (block 415—no), EIR/NSS device 240 may determine whether an IMSI included in the received ECR message is stored in NSS database 222 (block 425). For example, EIR/NSS device 240 may search NSS database 222 and determine if the IMSI included in the ECR is stored in NSS database 222. If EIR/NSS device 240 does not find the IMSI in NSS database 222 (block 425—no), EIR/NSS device 240 allows UE 110 to attach, generates an ECA message and forwards the ECA message to MME 210 indicating that UE 110 may proceed to attach to network 130 (block 445; FIG. 5A, 532). For example, in some scenarios, the NSS feature may not be provisioned on a SIM included on UE 110. That is, not all SIMs/subscribers use all features that may be available. In such a scenario, NSS database 222 may not be provisioned to store an IMSI for a UE 110 in which, for example, it is beneficial that the SIM be able to be moved from UE 110 to another UE.

If, however, EIR/NSS device 240 finds the IMSI in NSS database 222 (block 425—yes), EIR/NSS device 240 identifies state information stored with the IMSI record in NSS database 222 to determine how to proceed. For example, if EIR/NSS device 240 finds the IMSI in NSS database 222, EIR/NSS device 240 may determine if a state for the identified IMSI in NSS database 222 is set to an "inactive" state (block 430). For example, NSS database 222 may store state information identifying "inactive," "married" or "learn" states for entries in NSS database 222. The inactive state may correspond to EIR/NSS device 240 not using an IMSI/IMEI pairing in NSS database 222 to determine whether to allow UE 110 to attach to core network 130. The married state may correspond to a state in which UE 110 has previously attached to network 130 and the IMSI has been stored in NSS database 222 along with the corresponding IMEI associated with UE 110 when UE 110 first requested an attachment to core network 130. The learn state may correspond to a state in which EIR/NSS device 240 is learning and storing pairings of IMSIs and IMEIs for UEs 110 attempting to access network 130 for the first time.

If the IMSI state in NSS database 222 is set to an inactive state (block 430—yes), EIR/NSS device 240 may signal MME 210 with an ECA message (FIG. 5A, 532) indicating that UE 110 may attach to network 130 (block 445). MME 210 may forward the attach approval to base station 125 and UE 110 may proceed to attach to network 130. If EIR/NSS device 240 determines that the IMSI state is not set to inactive (block 430—no), EIR/NSS device 240 may further determine if the IMSI state in NSS database 222 is set to learn (block 435). If EIR/NSS device 240 determines that the IMSI state is set to learn (block 435—yes), EIR/NSS device 240 may store the IMEI included in the ECR message in the IMSI record associated with the IMSI included in the ECR message in NSS database 222 (block 450). In other words, EIR/NSS device 240 may pair or associate the IMSI with the IMEI received in the ECR message. EIR/NSS device 240 may also set the state of the IMSI record in NSS database 222 to "married" (block 455). In some implementations, EIR/NSS device 240 may also notify an operational support system (OSS) that the IMSI state for the stored IMSI record is set to married and provide the paired IMSI and IMEI to the OSS (block 460). EIR/NSS 240 may also allow UE 110 to attach and transmit an ECA message to MME 210 indicating that UE 110 may attach to core network 130 (block 445; FIG. 5A, 532).

Returning to block 435, if EIR/NSS device 240 determines that the IMSI state in NSS database 222 is not set to learn (i.e., state set to married) (block 435—no), EIR/NSS device 240 may compare the IMEI included in the received ECR message to the IMEI in the identified IMSI record (corresponding to the IMSI in the received ECR) in NSS database 222. If the IMEI from the ECR message does not match the IMEI in the identified IMSI record in NSS database 222 (block 440—no), EIR/NSS device 240 may deny the attach request and send an ECA message to MME 210 indicating that the attach request is denied (block 465). EIR/NSS device 240 may also notify an OSS of a security violation (block 470). For example, if the IMEI in the received ECR message does not match the IMEI in the identified record in NSS database 222, this may indicate that the physical SIM for UE 110 is not being used in an approved UE 110. That is, the physical SIM may have been removed from a first UE and placed in UE 110 in an unauthorized manner. If, however, the IMEI in NSS database 222 matches the IMEI received in the ECR message (block 440—yes), EIR/NSS device 240 may allow UE 110 to attach to core network 130 and transmit an ECA message to MME 210 indicating that UE 110 may attach to network 130 (block 445; FIG. 5A, 532). In this manner, EIR/NSS device 240 may approve or deny an attach request without relying on UE 110 or a SIM-resident application in UE 110 to perform any checks with respect to the IMEI on which the physical SIM resides.

Figure 5B:
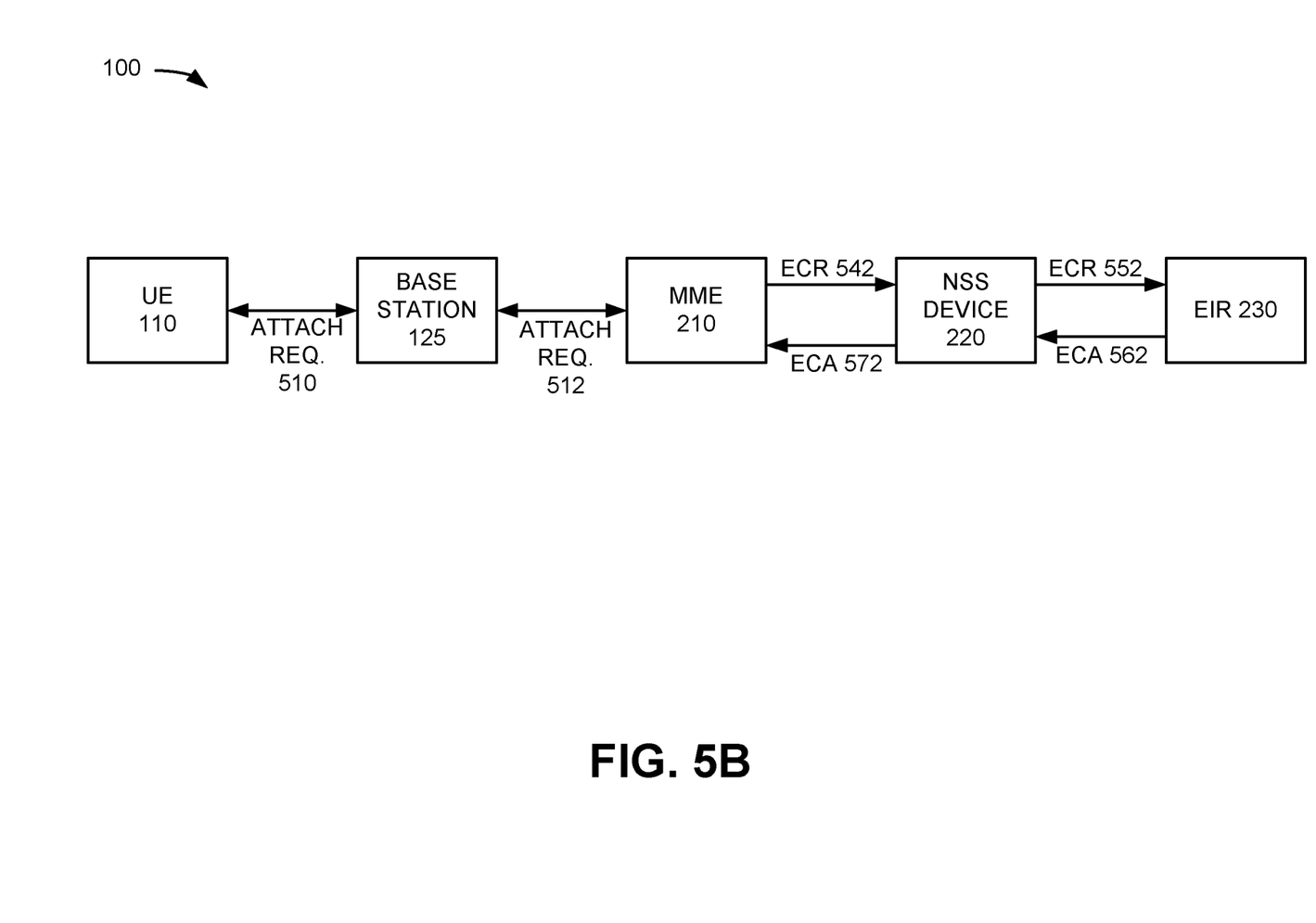
FIG. 5B is a signal diagram associated with the processing of FIG. 4 in accordance with another exemplary implementation.

As described in the example above, EIR/NSS device 240 may combine the functionality associated with an EIR with functionality associated with an NSS. In other implementations, NSS device 220 and EIR 230 may be standalone devices as illustrated in FIG. 2A. In this implementation, NSS device 220 may be coupled between MME 210 and EIR 230, as illustrated in FIG. 5B, and the ECR generated by MME 210 may be forwarded to EIR 230 either directly or via NSS device 220 (e.g., via ECR 542 and ECR 552). EIR 230 may then determine if the IMEI included in the ECR is blacklisted, as described above, and provide an ECA to NSS device 220 indicating whether the IMEI is blacklisted (ECA 562).

Upon receipt of the ECA by NSS device 220, NSS device 220 will inspect the ECA and if the IMEI is blacklisted, NSS device 220 will deny the attach by forwarding an ECA 572 to MME 210 indicating that the attach request is denied. If ECA 562 indicates that the host UE 110's IMEI is not blacklisted, NSS device 220 will perform the processing described above with respect to FIG. 4 at blocks 425-470 to determine whether UE 110 is authorized to attach to core network 130.

As described above, NSS device 220 and NSS database 222 may support the association of an IMSI and IMEI to determine whether to allow UE 110 to attach to core network 130. In some implementations, NSS device 220 and NSS database 222 may support associating multiple IMEIs with a single IMSI, while maintaining an existing binding between an IMSI and IMEI (i.e., an IMSI:IMEI pair). In such an implementation, the IMSI associated with UE 110 may be in a quasi-married/learn mode, whereby the IMSI remains bound to the original IMEI, and UE 110 may reattach to the network as often as needed using the original IMSI:IMEI pair, until such time as the IMSI attaches with a different UE 110 IMEI. For example, when UE 110 attaches with a new IMEI, NSS database 222 is updated with the new IMEI, the original IMEI is discarded or replaced and the IMSI:IMEI state for UE 110 is updated to "married." Having NSS database 222 associate multiple IMEIs with a single IMSI may allow a user to seamlessly upgrade his/her UE 110 to a new UE 110 or replace his/her UE 110 with a replacement or refurbished UE 110 (e.g., in case of a failure) with no discontinuity regarding NSS capability for the existing UE 110.

As also described above, pairing an IMEI with an IMSI in NSS database 222 may be performed during an attach procedure associated with UE 110 attempting to attach to core network 130. In other implementations, a service provider or other entity may pair an IMSI with an IMEI prior to or after an initial attach procedure. For example, when the IMEI and IMSI associated with a SIM card are both known, the service provider associated with core network 130 may store the IMSI:IMEI pair in NSS database 222 and set the state of the IMSI:IMEI pair to "married." In an exemplary implementation, the proactive binding of the IMSI:IMEI may be performed via a provisioning application programming interface (API) between NSS device 220 and an OSS. In addition, such a provisioning API between an OSS and NSS device 220 may be used to add IMSIs to NSS database 222, set the states of the IMSIs, update the states of the IMSIs as UEs 110 attach, etc. Such proactive binding of an IMEI with an IMSI may also be performed any time, such as before an initial attach procedure, after an initial attachment has been made and an IMEI has been learned, while UE 110 is actively attached to core network 130, etc.

Implementations described herein provide network security associated with UE devices attempting to attach to a network. Since the device(s) that are involved in determining whether to allow the UE device to attach to the network are controlled by the network service provider, a number of attacks initiated via unauthorized UE devices may be significantly reduced or eliminated. In addition, the use of NSS device 220 and/or EIR/NSS device 240 may be provided at any time during the lifecycle of a physical SIM to provide network security and does not require the UE device/SIM to connect to core network 130 to, for example, download any new software. That is, no special software is required on the physical SIM at the time that the physical SIM is first installed on a UE device or at a later time. Still further, the NSS device functionality and EIR/NSS functionality described herein may be used with any type of platform, including platforms that do not support SIM-based applications that have been used to check for security issues regarding a UE device on which the SIM resides.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been mainly described above with respect to a UE attempting to attach to a network that is a 4G LTE network. However, as described above, in other implementations, UE 110 may be attempting to attach to a 5G network. In such an implementation, an AMF may perform all or some of the processing described above with respect to MME 210 in FIGS. 4, 5A and 5B. However, NSS device 220 and/or EIR/NSS device 240 may perform similar processing as described above Further, while features have been described above with respect to a UE 110 that includes a physical SIM, implementations described herein may also be used in situations in which UE 110 includes an embedded SIM (eSIM).

Still further, while series of acts have been described with respect to FIG. 4, the order of the acts may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, from a user device, an attach request to attach to a network, wherein the attach request includes a first international mobile equipment identity (IMEI) and an international mobile subscriber identity (IMSI);
    determining whether the IMSI included in the attach request is stored in a database;
    determining whether a second IMEI associated with the IMSI is stored in the database, and if the second IMEI associated with the IMSI is stored in the database, determining whether the stored second IMEI matches the first IMEI included in the attach request;
    identifying, when the IMSI included in the attach request is stored in the database, a state associated with the IMSI;
    storing, in the database, the first IMEI included in the attach request with the IMSI in response to determining that the identified state associated with the IMSI corresponds to a first state; and
    approving or denying the attach request based on whether the IMSI included in the attach request is stored in the database, the identified state associated with the IMSI, and whether the second IMEI associated with the IMSI is stored in the database and the stored second IMEI matches the first IMEI included in the attach request.

2. The method of claim 1, wherein the approving or denying comprises:
    denying the attach request in response to determining that the second IMEI stored in the database does not match the first IMEI included in the attach request.

3. The method of claim 1, wherein the approving or denying comprises:
    approving the attach request in response to determining that the second IMEI stored in the database matches the first IMEI included in the attach request.

4. The method of claim 1, further comprising:
    determining, prior to determining whether the IMSI included in the attached request is stored in the database, whether the first IMEI included in the attach request is associated with a user device that is not allowed to attach to the network.

5. The method of claim 1, further comprising:
    determining whether the identified state associated with the IMSI corresponds to the first state or a second state.

6. The method of claim 5, further comprising:
    checking whether the second IMEI stored in the database matches the first IMEI included in the attach request in response to determining that the identified state corresponds to the second state.

7. The method of claim 1, further comprising:
    notifying a system associated with monitoring the network in response to determining that the second IMEI stored in the database does not match the first IMEI included in the attach request.

8. The method of claim 1, wherein denying the attach request further comprises:
    transmitting a first message to a mobile management entity (MME) device indicating that the attach request is denied; and
    forwarding, by the MME device and to a base station that received the attach request, a second message indicating that the attach request is denied.

9. The method of claim 1, wherein the user device includes a physical subscriber identity module (SIM), wherein the SIM does not perform access related authorization checking associated with the IMEI prior to transmitting the attach request.

10. A system, comprising:
    at least one device configured to:
        receive an attach request associated with a user device attempting to attach to a network, wherein the attach request includes a first international mobile equipment identity (IMEI) and an international mobile subscriber identity (IMSI);
        determine whether the IMSI included in the attach request is stored in a database;
        determine whether a second IMEI associated with the IMSI is stored in the database, and if the second IMEI associated with the IMSI is stored in the database, determine whether the stored second IMEI matches the first IMEI included in the attach request; and
        approve or deny the attach request based on whether the IMSI included in the attach request is stored in the database and whether the second IMEI associated with the IMSI is stored in the database and the stored second IMEI matches the first IMEI included in the attach request,
    wherein the at least one device comprises:
    a first network device configured to determine whether the first IMEI included in the attach request is associated with a user device that is not allowed to attach to the network; and
    a second network device configured to determine whether the second IMEI stored in the database matches the first IMEI included in the attach request.

11. The system of claim 10, wherein when approving or denying, the at least one device is further configured to:
    deny the attach request in response to determining that the second IMEI stored in the database does not match the first IMEI included in the attach request.

12. The system of claim 10, wherein when approving or denying, the at least one device is further configured to:
    approve the attach request in response to determining that the second IMEI stored in the database matches the first IMEI included in the attach request.

13. The system of claim 10, wherein the at least one device is further configured to:
    determine, prior to determining whether the IMSI included in the attached request is stored in the database, whether the first IMEI included in the attach request is associated with a user device that is not allowed to attach to the network.

14. The system of claim 10 wherein the at least one device is further configured to:
   determine whether a state associated with the IMSI corresponds to a first state or a second state; and
   store the first IMEI included in the attach request with the IMSI in response to determining that the state corresponds to the first state.

15. The system of claim 14, wherein the at least one device is further configured to:
   check whether the second IMEI stored in the database matches the first IMEI included in the attach request in response to determining that the state corresponds to the second state.

16. The system of claim 10, wherein the approving or denying the attach request comprises denying the attach request, and the at least one device is configured to:
   notify a system associated with monitoring the network that an unauthorized user device attempted to attach to the network, in response to determining that the second IMEI stored in the database does not match the first IMEI included in the attach request;
   transmit a first message to a mobile management entity (MME) device indicating that the attach request is denied; and
   forward, to a base station that received the attach request, a second message indicating that the attach request is denied.

17. The system of claim 10, wherein the
   first network device comprises an equipment identify register device; and
   the second network device comprises a network subscriber identity module secure device.

18. A non-transitory computer-readable medium having stored thereon sequences of instructions which, when executed by at least one processor, cause the at least one processor to:
   receive a mobile equipment identity check request (ECR) message, wherein the ECR message includes a first international mobile equipment identity (IMEI) and an international mobile subscriber identity (IMSI);
   determine whether the IMSI included in the attach request is stored in a database;
   determine whether a second IMEI associated with the IMSI is stored in the database, and if the second IMEI associated with the IMSI is stored in the database, determine whether the stored second IMEI matches the first IMEI included in the attach request;
   identify, when the IMSI included in the attach request is stored in the database, a state associated with the IMSI;
   store, in the database, the first IMEI included in the attach request with the IMSI stored in the database and update the state associated with the IMSI to a first state in response to determining that the identified state associated with the IMSI corresponds to a second state; and
   approve or deny the attach request based on whether the IMSI included in the attach request is stored in the database, the identified state associated with the IMSI, and whether the second IMEI associated with the IMSI is stored in the database and the stored second IMEI matches the first IMEI included in the attach request.

19. The non-transitory computer-readable medium of claim 18, wherein when approving or denying, the instructions further cause the at least one processor to:
   approve the attach request in response to determining that the second IMEI stored in the database matches the first IMEI included in the attach request.

20. The non-transitory computer-readable medium of claim 18, wherein the instructions further cause the at least one processor to:
   determine whether the state associated with the IMSI corresponds to a first state or a second state; and
   check whether the second IMEI stored in the database matches the first IMEI included in the attach request in response to determining that the state corresponds to the first state.

* * * * *